United States Patent [19]

Ragan et al.

[11] 4,403,252
[45] Sep. 6, 1983

[54] TELEVISION SCRAMBLING AND UNSCRAMBLING METHOD AND APPARATUS

[75] Inventors: Lawrence H. Ragan; Clinton S. Hartmann, both of Dallas, Tex.

[73] Assignee: R F Monolithics, Inc., Dallas, Tex.

[21] Appl. No.: 352,773

[22] Filed: Feb. 26, 1982

Related U.S. Application Data

[63] Continuation of Ser. No. 153,164, May 27, 1980, abandoned.

[51] Int. Cl.³ ............... H04N 7/16; H04K 1/00
[52] U.S. Cl. ............... 358/114; 358/118; 455/304; 455/305
[58] Field of Search ............... 358/114, 119, 123, 905, 358/118; 455/304, 305

[56] References Cited

U.S. PATENT DOCUMENTS

| | | | |
|---|---|---|---|
| 2,972,008 | 2/1961 | Ridenour et al. | 358/123 |
| 3,737,785 | 6/1973 | Korpel | 358/86 |
| 4,002,825 | 1/1977 | Lewis | 358/123 |
| 4,060,833 | 11/1977 | Onyshkevych | 358/905 |
| 4,100,496 | 7/1978 | Akiyoshi et al. | 358/905 |

FOREIGN PATENT DOCUMENTS 656239 4/1979 U.S.S.R. ............... 358/123

OTHER PUBLICATIONS

NASA Tech. Briefs, vol. 3, No. 1, MSC-16843, 1979.

*Primary Examiner*—S. C. Buczinski
*Attorney, Agent, or Firm*—Kanz & Timmons

[57] ABSTRACT

The present invention provides a method and apparatus for scrambling and unscrambling television signals to prevent reception of acceptable signals by an unauthorized television receiver while maintaining the television signal recoverable by an authorized receiver. The present invention can also be used for reducing the necessary carrier signal power of a television transmitter.

A transmitter (12) passes a television signal through at least one linear filter (30, 32 and 34) of the type that produces multiple time delayed signals of differing time delays.

A receiver (14) receives the multiple time delayed signals from the transmitter and passes them through at least one linear filter (64, 66 and 68) to add the signals together so that one signal representative of the original is reinforced, allowing acceptable reception by an authorized viewer.

In one arrangement, the linear filters are SAW devices. In another arrangement, the linear filters are of a type employing charge coupled devices and in yet another arrangement, the linear filters are of digital types. In yet another arrangement, high frequency linear filters are of a ferromagnetic type. Different scrambling codes are achieved.

23 Claims, 5 Drawing Figures

TELEVISION SCRAMBLING AND UNSCRAMBLING METHOD AND APPARATUS

This is a continuation of application Ser. No. 153,164 filed May 27, 1980, now abandoned.

DESCRIPTION

1. Technical Field

This invention relates to methods and apparatus for preventing a television signal from being acceptably received by an unauthorized television receiver while maintaining the television signal recoverable by an authorized receiver.

Subscription television is now in wide and growing use in both cable television and over-the-air systems. In over-the-air systems, preventing unauthorized receivers from receiving the transmission is a major problem for subscription services, but even cable television systems might desire to have different classes of customers which can be serviced over the same cable. For instance, a special rate might be charged for customers who want to view certain sporting events or first run movies. In order to solve these problems, many systems have been developed for preventing the reception of an acceptable television signal by unauthorized receivers.

2. Background Art

Methods of scrambling and unscrambling television signals to prevent unauthorized viewing of protected material have been proposed almost since the inception of television. Everything for moving mirrors shown in U.S. Pat. No. 2,531,974, to inserted carriers shown in U.S. Pat. No. 4,074,311 have been proposed. Some systems in use today seek to modify the synchronization pulses in the video signal as shown in U.S. Pat. No. 3,924,059 or insert interfering video signals which are subsequently removed in the unscrambling device as shown in U.S. Pat. No. 4,112,464 or insert interfering carriers at the transmitter which are subsequently removed in the unscrambling device with notch filters as shown in U.S. Pat. No. 4,074,311.

Synchronization pulse modification or suppression and video signal superposition are expensive to perform in the decoder function, requiring demodulation of the received coded signal, and in the case of a set top decoder, the remodulation of the signal after it has been restored to viewable condition. While the injection of interfering carrier systems do not require demodulation and remoduation, they have other disadvantages. Such systems can be easily defeated by persons with only modest means and effort. Extra transmitter power must be devoted to the interfering carrier. This is detrimental in cable systems, not so much for the slight penalty in consumed energy, but for the care and expense that is involved in maintaining linearity in all the amplifiers that must amplify the signals. The linearity problem becomes especially severe in over-the-air transmission systems because of the high transmitter power involved.

DISCLOSURE OF INVENTION

In accordance with the present invention, a method for preventing a television signal from being acceptably received by an unauthorized television receiver while maintaining the television signal recoverable by an authorized receiver includes passing the television signal through at least one linear filter of the type that produces multiple time delayed signals of different time delays. The multiple time delayed signals are then transmitted and received. They are then passed through at least one receiver linear filter of the type that produces multiple time delayed signals of different time delays. The time delays of the multiple signals of the receiver are spaced in time so that they reinforce the received multiple time delayed signals, creating one output signal which is reinforced significantly more than the remaining output signals.

The transmitting linear filter in different embodiments either shifts the phase of at least one of the multiple time delayed signals with respect to at least one other of the multiple time delayed signals, which can include inverting the phase of at least one of the multiple time delayed signals with respect to others, or varies the amplitude of the multiple time delayed signals with frequency or varies the time delay with frequency. In each case, the receiver includes a linear filter which compensates for the function of the linear filter in the transmitter so that the final reinforced signal is a substantially true representation of the original video signal.

The at least one linear transmitter filter is in the signal path, but it can be in the video path prior to the video being modulated by the carrier or in the modulated carrier part of the path or right before transmission after mixing with the output of the transfer oscillator. Similarly, the at least one linear receiver filter can be located in various parts of the receiver's signal path.

If a linear filter is in the video part of the signal path, then a preferred embodiment is of the charge coupled device or digital approximation type. When the linear filter is elsewhere, one preferred embodiment includes Surface Acoustic Wave devices known as SAW devices. At extremely high frequencies, a preferred embodiment of the linear filter includes ferromagnetic materials so that the signal takes on the nature of magnetostatic waves. Such linear filters can also be recursive in nature in the various embodiments.

These and other objects, advantages, and features of this invention will be apparent from the following description taken with reference to the accompanying drawings, wherein is shown the preferred embodiments of the invention.

BRIEF DESCRIPTION OF DRAWING

The details of the invention will be described in connection with the accompanying drawing, in which.

BEST MODE FOR CARRYING OUT THE INVENTION

Figure 1:
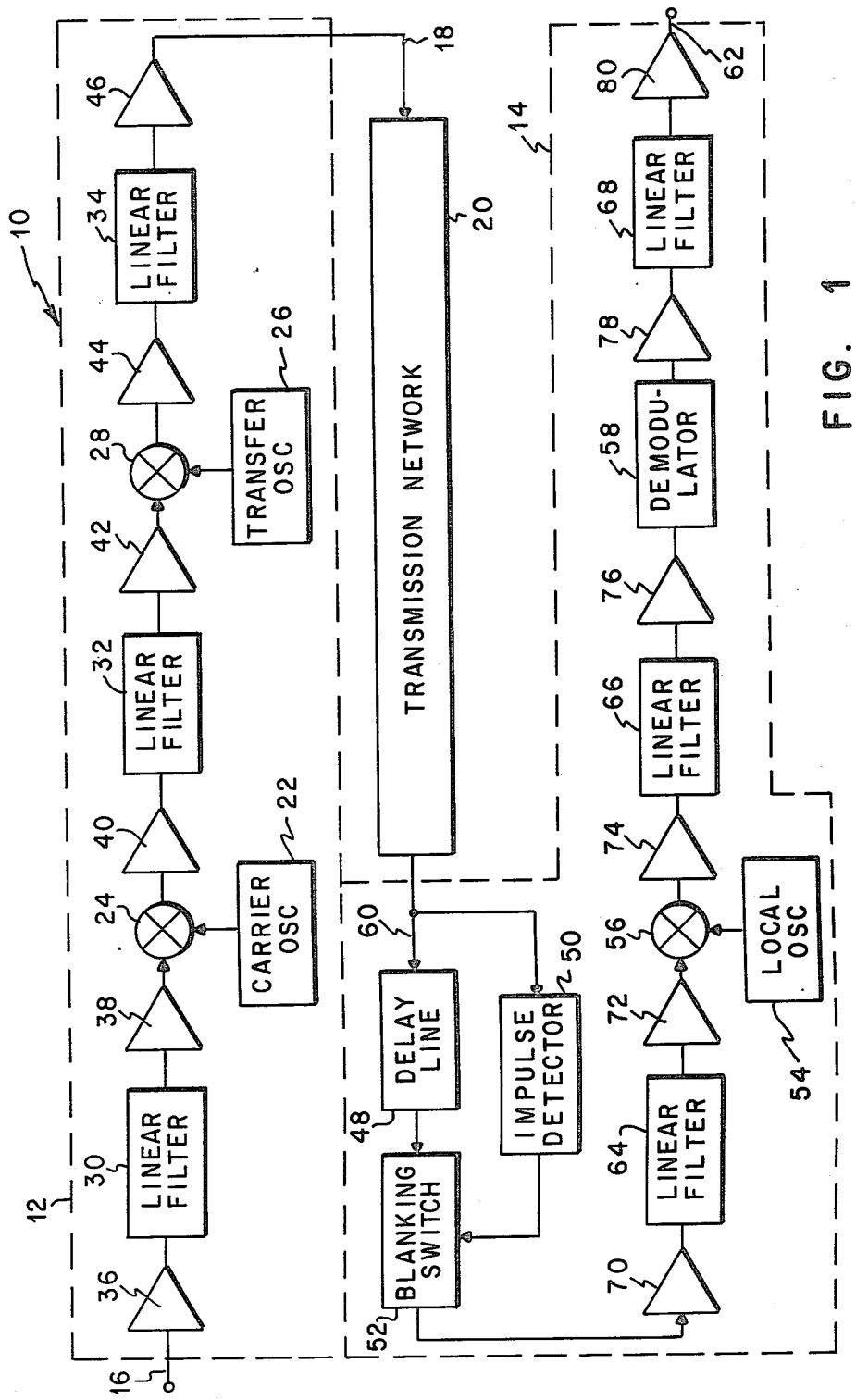
FIG. 1 is a block diagram of a system according to the present invention, including a transmitter and a receiver, for preventing a television signal from being acceptably received by an unauthorized television receiver while maintaining the television signal recoverable by an authorized receiver.

Referring now to the drawing, and in particular to FIG. 1, a system according to the present invention for transmitting and receiving a television signal is referred to generally by reference numeral 10. System 10 includes an apparatus 12 for preventing a television signal from being transmitted for acceptable use by an unauthorized television receiver while maintaining the television signal recoverable by an authorized receiver and an apparatus 14 for receiving and decoding such a signal. Apparatus 12 includes a means for generating a television signal, having an input 16 for a video signal, an output 18 to a transmission network 20, a signal path connecting the input to the output, a carrier oscillator 22 for generating a carrier signal, a first mixer 24 for modulating the carrier signal with the video signal, a transfer oscillator 26 and a second mixer 28 for mixing the modulated carrier signal with the output of transfer oscillator 26. Transmission network 20 might typically comprise, for example, at least two antennas and associated feed lines for transmitting and receiving the signals through space, or a cable transmission system, or satellite transmission paths, or other transmission means. Apparatus 12 also includes at least one linear filter in the signal path through which the signal must pass, of the type that produces multiple time delayed signals of different time delays, each time delayed signal representative of the corresponding signal at the input of the linear filter, in this case linear filter 30 located in the signal path between input 16 and first mixer 24, linear filter 32 located in the signal path between first mixer 24 and second mixer 28, and linear filter 34 located in the signal path between second mixer 28 and output 18. The signal path thus includes input 16, a video frequency amplifier 36, linear filter 30, a video frequency amplifier 38, mixer 24, an intermediate frequency amplifier 40, linear filter 32, another intermediate frequency amplifier 42, second mixer 28, a radio frequency amplifier 44, linear filter 34 and a radio frequency amplifier 46. All of the described linear filters will not be required in most systems. Apparatus 12 as shown represents three possible locations for linear filters in a transmitter which could be used singly or in concert.

After the signal from output 18 is transmitted through transmission network 20, it is received by apparatus 14 which is a means for receiving the transmitted signals. Apparatus 14 includes an impulse noise blanking circuit comprising delay line 48 which is in the signal path, impulse detector 50 which bypasses delay line 48, and blanking switch 52 which is in the signal path, but responsive to impulse detector 50. Apparatus 14 also includes means for producing a video signal from a television signal, including a local oscillator 54 and a mixer 56 for mixing the output of local oscillator 54 with a television signal converting the frequency of the signal to the intermediate frequency, demodulator 58 for converting the intermediate frequency to video frequency, input 60 for receiving the television signal from the transmission network, and output 62 for the video signal. Apparatus 14 also includes at least one linear filter, in this case linear filter 64 located in the signal path between input 60 and mixer 56, linear filter 66 located in the signal path between mixer 56 and demodulator 58 and linear filter 68 located in the signal path between demodulator 58 and output 62. The signal path through apparatus 11 thus includes input 60, delay line 48, blanking switch 52, a radio frequency amplifier 70, linear filter 64, a radio frequency amplifier 72, mixer 56, an intermediate frequency amplifier 74, linear filter 66, another intermediate frequency amplifier 76, demodulator 58, a video frequency amplifier 78, linear filter 68, another video frequency amplifier 80 and output 62. As in the transmitter, not all linear filters may be required in all systems. Apparatus 14 represents three possible locations for linear filters in a receiving apparatus.

In order to be effective, a linear filter in the present invention must include delays approximately as long as the sweep time necessary to define features of interest in the resultant picture. For example, with television systems in widespread use today, the smallest sweep time is in the horizontal direction and is approximately 50 microseconds long. If it is desired to prevent unauthorized viewers from distinguishing features of the order of 10 percent of the screen width, total delay in the linear scrambling filter set must be approximately 5 microseconds in length, disregarding delay required for spectral weighting which may be necessary to provide distortion free reconstruction of the coded signal in the unscrambling filter set. If larger feature sizes must be masked, or if the scrambling is designed to cause unauthorized television receivers to fail to achieve or hold synchronization, even longer time delays are required in the linear filters. The original television signal is scrambled to such an extent that display of an acceptable picture is impossible without descrambling the multiple time delayed signals.

Figure 2:
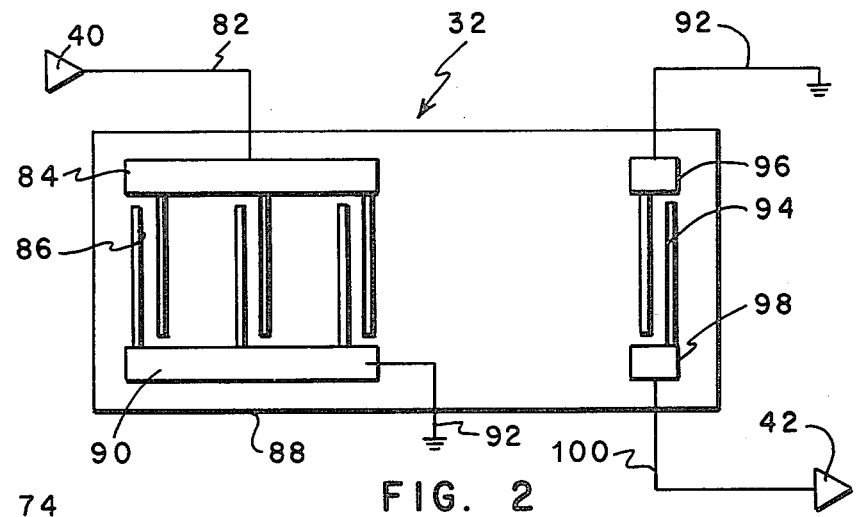
FIG. 2 is a pictorial representation and schematic diagram of a linear filter of the type that produces multiple time delayed signals of different time delays for use in the transmitter of the system of FIG. 1.

Referring now to FIG. 2, in one embodiment of linear filter 32 the intermediate frequency output of amplifier 40 is fed to linear filter 32 by means of bond wire 82 to pad 84. Pad 84 distributes the signal to metal fingers 86 which excite a surface wave in piezoelectric material substrate 88. A pad 90 connects the complementary fingers of finger pairs 86 to ground return 92. The surface wave traverses the substrate and is intercepted by metal fingers 94. A pad 96 connected to one of the metal fingers 94 is also connected to ground return 92 while a pad 98 connected to the complementary fingers provides input to intermediate frequency amplifier 42 by bond wire 100. The output signal in this example would consist of the input signal and two replicas of the input signal at different time delays determined by the spacing between the metal finger pairs 86. In this example, the three signals in the output are of equal strength, causing appearance on the television screen of an unauthorized viewer not equipped with a correct unscrambling filter, of a picture with two ghosts so strong as to deny identification of the intended picture. The lengths or amount of overlap between the various finger pairs can be varied so that the output signals are not of equal strength. Similarly, spacing between the pairs can be varied so that the time delays are unequal in length.

Figure 3:
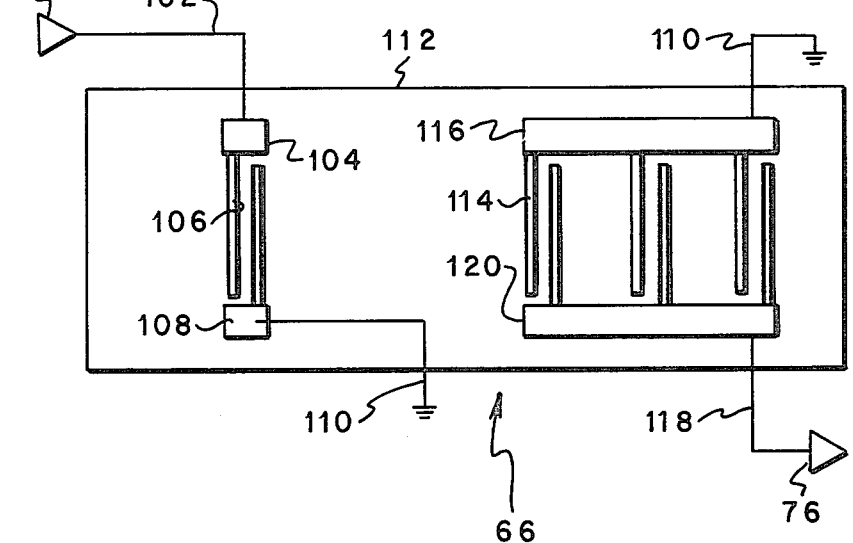
FIG. 3 is a linear filter of the type that produces multiple time delayed signals of different time delays for use in the receiver of the system of FIG. 1.

Referring now to FIG. 3, linear filter 66 in apparatus 14 includes a bond wire 102 for transmitting the output of intermediate frequency amplifier 74 to a pad 104 and metal fingers 106. A pad 108 is connected to the complementary fingers of pairs 106 as well as to receiver ground 110. The scrambled signals then traverse a piezoelectric substrate 112 to metal finger pairs 114. The ground side of metal finger pairs 114 is connected to ground 110 through a pad 116. A bond wire 118 connects a pad 120 for the complementary fingers of pairs 114 to the input of intermediate frequency amplifier 76. Metal finger pairs 106 and 114 are designed to have the reverse effect of transmitter metal finger pairs 94 and 86. The three signals transmitted from metal finger pairs 106 are all received at a single time by the pairs 114 so as to reinforce the signal. There are also unwanted side lobe signals, but the side lobe signals are not as strongly reinforced. An ST cut of quartz crystal is workable for the substrate. The width of the substrate must take into account beam spreading and the packaging available, but will typically be between 0.2 inches and 0.25 inches. The thickness will normally be as thin as possible for economic reasons, but will typically be 0.025 inches. For a delay in the order of 10 microseconds, the length will be in the range of 1.20 and 1.30 inches.

Typically, one transducer will have several tens of finger pairs and the second will have several hundred. Spectral weighting will be typically included in the transmitter apparatus in systems with few transmitters and many receivers, since longer time delays are required in linear filters which include weighting. A typical linear filter included in a transmitter apparatus would have up to several thousand fingers in one transducer and several tens in the other.

The phase and amplitude of the scrambling filters and the descrambling filters will be typically complementary in the sense that the product of the amplitudes of their frequency response will be essentially constant with frequency, and the total of their phase responses will be linear over the information band of interest. When these conditions are met, distortion free reconstruction of the scrambled signal is assured. Linear filters which pass the signal through the delay paths one time are called transversal, while those with feedback paths such that the signal passes through the delay path multiple times are called recursive. Both types are applicable in television scrambling, and are within the scope of the invention. Recursive filters are typically realized in digital and CCD form.

Figure 4:
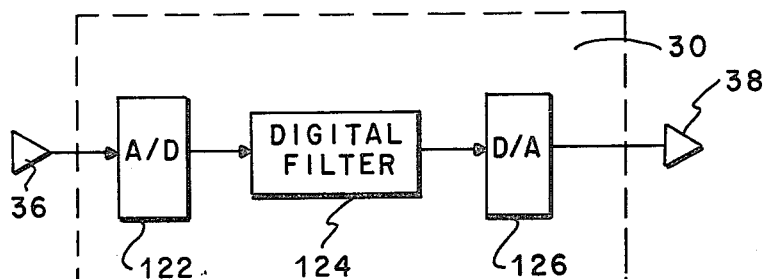
FIG. 4 is a block diagram representation of another linear filter for use in the transmitter of the system shown in FIG. 1.
Figure 5:
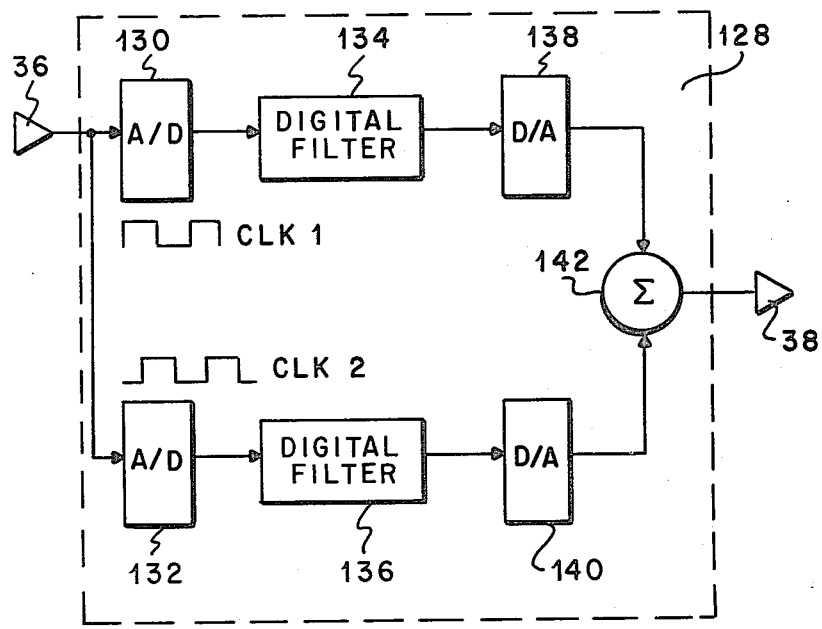
FIG. 5 is a block diagram representation of another embodiment of a linear filter for use in the transmitter of the system of FIG. 1.

Referring now to FIG. 4, one embodiment of linear filter 30 includes an analog to digital converter 122 for converting the video output of video amplifier 36 into digital form, a digital filter 124 for creating multiple time delayed digital signals of different time delays, each representative of the original digital signal at the output of analog to digital converter 122, and a digital to analog converter 126 for converting the multiple time delayed digital signals at the output of digital filter 124 into multiple time delayed analog signals acceptable for input to video amplifier 38. Referring also to FIG. 5, a specific embodiment 128 of linear filter 30 includes analog to digital converters 130 and 132 for converting the output of video frequency amplifier 36 into digital form, but the conversion is accomplished with clock wave forms that are 90 degrees out of phase which is known as "phase quadrature". The digital outputs of these converters are then converted to multiple time delayed outputs by digital filters 134 and 136. The multiple time delayed outputs of digital filters 134 and 136 are converted back into multiple time delayed analog signals by digital to analog converters 138 and 140 respectively. Finally, the multiple time delayed outputs of digital to analog converters 138 and 140 are added by means of summing network 142.

Rendering the signal unviewable can be accomplished in a number of ways. The signal can be coded in such a way that many images appear on the screen, making the picture confusing and unpleasant to watch. If the images are placed close enough together the picture appears smeared beyond recognition. Other choices of code for the scrambling filter result in the failure of the unequipped receiving set to acquire horizontal or vertical synchronization, so that the picture "tears" or "rolls", making it unacceptable.

Some choices of code result in transmission system efficiency improvement. Those codes for which the frequency spectra exhibits lower amplitude near the carrier frequencies in a television signal lower the average power required from the transmitter for acceptable signal to noise performance in the receiver equipped with the corresponding descrambling filter. Other choices of code result in reductions in peak power required in the transmitter for equivalent results. These economies may in some cases outweigh the cost of the scrambling and descrambling filters, resulting in systems coded and decoded solely for transmission efficiency and economic reasons, rather than for the purpose of denying utilization by unauthorized receivers of the video information. Obviously, the scrambling could also be used in a system to achieve both signal security and transmission efficiency.

Since scrambling the television signal results in spreading it in time, the system demonstrates immunity to impulse noise, such as automobile ignition noise, picked up in the transmission path anywhere between the scrambling filter set and the descrambling filter set. Short interfering impulses are spread in time in the decoding filter set, reducing their amplitude in the output video. This characteristic of the system makes use of the impulse noise blanking system comprising delay line 49, impulse detector 50 and blanking switch 52 practical. Impulse noise blanking for television systems in the past was of little use, since typically blanking a noise pulse would simply change a white area of the screen to a black area of the screen or vice versa, but with the present invention there is redundancy so that blanking the noise will simply create a slightly ligher patch on the screen which may not even be noticeable.

This same smoothing characteristic is useful in combining linear filter scrambling techniques with signal switching scrambling methods which might otherwise prove unpractical. A switching scrambler added to the transmitter apparatus after the first linear filter and a switching descrambler added to the receiver before the last linear filter could be included to further scramble the signal. Unlike systems without the smoothing effects of linear filters, switching can be accomplished asynchronously to the sweep rate without visible effects in the reconstructed signal when the systems are combined. Scrambling with asynchronous switching waveforms is much more difficult to defeat than scrambling with switching waveforms synchronized to the video sweep rate. Asynchronous switching is not commonly used because imprecision in the descrambling apparatus which reconstructs the video results in unacceptable visible effects in the video output.

Another suitable embodiment for linear filter 30 is a linear filter of the charge coupled device type. A suitable linear filter for extremely high frequency, such as linear filters 34 and 64 comprises ferromagnetic materials in the signal path and through which a signal must pass. The multiple time delayed signals in such a linear filter are in the form of magnetostatic waves of differing time delays.

Receiver 14 does not, of course, have to be a single unit or in a single "box". It is contemplated that in some applications, a receiver linear filter and its accompanying descrambling apparatus will be a separate unit for use in combination with a conventional television set.

From the foregoing it will be seen that this invention is one well adapted to obtain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A method for preventing a television signal from being acceptably received by an unauthorized television receiver while maintaining the television signal recoverable by an authorized receiver having a linear filter in the signal path of the type which produces multiple time delayed signals, the method comprising passing the television signal through at least one linear filter of the type that produces multiple time delayed signals of differing time delays, each time delayed signal representative of the original television signal wherein the original television signal is scrambled by adding the multiple time delayed signals which would be displayed to an unauthorized receiver so that display of an acceptable picture is impossible without descrambling the multiple time delayed signals and wherein the phase and amplitude response of the linear filter is substantially complementary over a predetermined information band to the phase and amplitude response of the linear filter of the authorized receiver.

2. A method according to claim 1 further comprising shifting the phase of at least one of the multiple time delayed signals with respect to at least one other of the multiple time delayed signals.

3. A method according to claim 1 further comprising amplitude weighting the multiple delayed signals by varying the amplitude of at least one of the multiple delayed signals with respect to at least one other of the multiple delayed signals.

4. A method for preventing a television signal from being acceptably received by an anauthorized television receiver while maintaining the television signal recoverable by an authorized receiver having a linear filter of the type which produces multiple time delayed signals, the method comprising passing the television signal through at least one transversal linear filter of the type that produces multiple time delayed signals of differing time delays, each time delayed signal representative of the original television signal wherein the original television signal is scrambled by adding the multiple time delayed signals which would be displayed to an unauthorized receiver so that display of an acceptable picture is impossible without descrambling the multiple time delayed signals and wherein the phase and amplitude response of the linear filter is substantially complementary over a predetermined information band to the phase and amplitude of the linear filter of the authorized receiver.

5. A method for transmitting and receiving a television signal comprising in combination:

passing the television signal through at least one transmitter linear filter of the type that produces multiple time delayed signals of differing time delays, each time delayed signal representative of the original television signal wherein the original television signal is scrambled by adding the multiple time delayed signals so that display of an acceptable signal is impossible without descrambling the multiple time delayed signals;

transmitting the multiple time delayed signals;

receiving the multiple time delayed signals;

passing the multiple time delayed signals through at least one receiver linear filter of the type that produces multiple time delayed signals of differing time delays wherein the phase and amplitude responses of the transmitter linear filter and the receiver linear filter are substantially complementary whereby the time delays of the multiple signals of the receiver are spaced in time so that they reinforce the received multiple time delayed signals creating one output signal which is reinforced significantly more than the remaining output signals.

6. A method according to claim 5 further comprising, following receiving the multiple time delayed signals and prior to passing the multiple time delayed signals through the at least one receiver linear filter, the combination of:

detecting the presence of any noise impulse; and blanking any detected noise impulse.

7. A method according to claim 5 further comprising:

modulating the multiple time delayed signals prior to transmitting; and demodulating the multiple time delayed signals after receiving.

8. An apparatus for preventing a television signal from being acceptably transmitted for use by an unauthorized television receiver while maintaining the television signal recoverable by an authorized receiver having a linear filter in the signal path of the type which produces multiple time delayed signals, comprising in combination:

means for generating a television signal, having an input for a video signal, an output for a transmission network and a signal path connecting the input to the output; and at least one linear filter in the signal path and through which a signal must pass, of the type that produces multiple time delayed signals of differing time delays, each time delayed signal representative of the corresponding signal at the input of the linear filter wherein the television signal at the output of the means for generating a television signal is scrambled by adding the multiple time delayed signals which would be displayed to an unauthorized receiver so that display of an acceptable picture is impossible without descrambling the multiple time delayed signals and wherein the phase and amplitude response of the linear filter is substantially complementary over a predetermined information band to the phase and amplitude response of the linear filter of the authorized receiver.

9. An apparatus according to claim 8 wherein the means for generating a television signal includes a carrier oscillator and a mixer for modulating the carrier signal with a video signal, and wherein the at least one linear filter is a surface acoustic wave filter located in the signal path between the mixer and the output.

10. An apparatus according to claim 8 wherein the means for generating a television signal includes a carrier oscillator and a mixer for modulating the carrier signal with a video signal, and wherein the at least one linear filter is a digital linear filter located in the signal path between the input to the means for generating a television signal and the mixer.

11. An apparatus according to claim 8 wherein the means for generating a television signal includes a carrier oscillator and a mixer for modulating the carrier signal with a video signal, and wherein the at least one linear filter is a charge coupled device linear filter located in the signal path between the input to the means for generating a television signal and the mixer.

12. An apparatus according to claim 8 wherein the means for generating a television signal comprises:
  a carrier oscillator for generating a carrier signal;
  a first mixer for modulating the carrier signal with a video signal;
  a transfer oscillator; and
  a second mixer for mixing the modulated carrier signal with the output of the transfer oscillator; and
  wherein the at least one linear filter is a SAW linear filter located in the signal path between the first mixer and the second mixer.

13. An apparatus according to claim 8 wherein the means for generating a television signal comprises:
  a carrier oscillator;
  a first mixer for modulating the carrier with a video signal;
  a transfer oscillator; and
  a second mixer for mixing the modulated carrier signal with the output of the transfer oscillator;
  wherein the at least one linear filter is a SAW linear filter located in the signal path between the second mixer and the output.

14. An apparatus according to claim 8 wherein the means for generating a television signal comprises:
  a carrier oscillator;
  a first mixer for modulating the carrier with a video signal;
  a transfer oscillator; and
  a second mixer for mixing the modulated carrier signal with the output of the transfer oscillator;
  wherein the at least one linear filter is a charge coupled device linear filter located in the signal path between the first mixer and the second mixer.

15. An apparatus according to claim 8 wherein the means for generating a television signal comprises:
  a carrier oscillator;
  a first mixer for modulating the carrier with a video signal;
  a transfer oscillator; and
  a second mixer for mixing the modulated carrier signal with the output of the transfer oscillator;
  wherein the at least one linear filter is a charge coupled device linear filter located in the signal path between the second mixer and the output.

16. An apparatus according to claim 8 wherein the at least one linear filter comprises means for varying the delay time of a signal according to frequency wherein the signal at the output of the means for generating a television signal varies with frequency to such an extent that display of an acceptable picture for a descrambled television signal is impossible without compensating for the difference in delay times of the various frequencies.

17. An apparatus for preventing a television signal from being acceptably transmitted for use by an unauthorized television receiver while maintaining the television signal recoverable by an authorized receiver having a linear filter in the signal path of the type which produces multiple time delayed signals, comprising in combination:
  means for generating a television signal, having an input for a video signal, an output for a transmission network and a signal path connecting the input to the output; and
  at least one transversal linear filter in the signal path and through which a signal must pass, of the type that produces multiple time delayed signals of differing time delays, each time delayed signal representative of the corresponding signal at the input of the transversal linear filter wherein the television signal at the output of the means for generating a television signal is scrambled by adding the multiple time delayed signals which would be displayed to an unauthorized receiver so that display of an acceptable picture is impossible without descrambling the multiple time delayed signals and wherein the phase and amplitude response of the linear filter is substantially complementary over a predetermined information band to the phase and amplitude response of the linear filter of the authorized receiver.

18. An apparatus for receiving a television signal scrambled by an apparatus having at least one linear filter in the signal path of the type which produces multiple time delayed signals, each time delayed signal representative of an original signal, and producing an acceptable video signal, comprising in combination:
  means for receiving a television signal and generating a video signal, having an input for the television signal, an output for the video signal and a signal path connecting the input to the output; and
  at least one linear filter in the signal path and through which a signal must pass, of the type that produces multiple time delayed signals of differing time delays, each time delayed signal representative of the corresponding signal at the input of the linear filter wherein the at least one linear filter has amplitude and phase characteristics complementary to the amplitude and phase characteristics of the at least one linear filter in the scrambling apparatus such that the product of their amplitude responses are approximately constant and the sum of their phase responses are approximately linear over the bandwidth of the television signal whereby the scrambled signal at the input of the means for generating a video output is reinforced to yield an acceptable signal.

19. An apparatus according to claim 18 wherein the means for receiving a television signal and producing a video signal includes a demodulator and wherein the at least one linear filter is a surface acoustic wave filter located in the signal path between the input and the demodulator.

20. An apparatus according to claim 18 wherein the means for receiving a television signal and producing the video signal includes;
  a local oscillator;
  a mixer for mixing the output of the local oscillator with the television frequency signal and producing an intermediate frequency signal; and
  a demodulator for changing the intermediate frequency signal into a video signal, and wherein the at least one linear filter is a SAW linear filter located in the signal path between the output of the mixer and the input to the demodulator.

21. An apparatus according to claim 18 wherein the means for receiving a television signal and producing a video signal comprises in combination:
- a local oscillator; and
- a mixer for mixing the output of the local oscillator with the television frequency signal, and wherein the at least one linear filter comprises a SAW device linear filter located between the input to the means for receiving a television signal and generating a video signal and the input to the mixer.

22. A method for preventing a television signal of the conventional type having vertical and horizontal sweep times from being acceptably received by an unauthorized television receiver while maintaining the television signal recoverable by an authorized receiver which produces multiple time delayed signals of differing time delays, the method comprising producing at least several tens of multiple time delayed signals of differing time delays wherein a time interval between temporally adjacent time delayed signals is a non-integral multiple of the shorter of the vertical and horizontal television signal sweep times, each time delayed signal representative of the original television signal wherein the original television signal is scrambled by adding the multiple time delayed signals which would be displayed to an unauthorized receiver so that display of an acceptable picture is impossible without descrambling the multiple time delayed signals and wherein the phase and amplitude of the multiple time delayed signals produced are substantially complementary over a predetermined information band to the phase and amplitude of the multiple time delayed signals of the authorized receiver.

23. A method for transmitting and receiving a television signal of the conventional type having vertical and horizontal sweep times, comprising in combination:
- producing at least several tens of multiple time delayed signals of differing time delays wherein a time interval between temporally adjacent time delayed signals is a non-integral multiple of the shorter of the vertical and horizontal television sweep times, each time delayed signal representative of the original television signal wherein the original television signal is scrambled by adding the multiple time delayed signals so that display of an acceptable signal is impossible without descrambling the multiple time delayed signals;
- transmitting the multiple time delayed signals;
- receiving the multiple time delayed signals;
- producing multiple time delayed signals of differing time delays representative of the received multiple time delayed signals wherein the time delays of the multiple signals of the receiver are spaced in time so that they reinforce the received multiple time delayed signals creating one output signal which is reinforced significantly more than the remaining output signals.

\* \* \* \* \*